United States Patent [19]

Toomey et al.

[11] 4,211,211

[45] Jul. 8, 1980

[54] SOLAR ENERGY COLLECTOR AND TRANSFER APPARATUS

[75] Inventors: Gerald P. Toomey, Warfordsburg; John L. Grove, Greencastle; John R. Fries, Meadowbrook, all of Pa.

[73] Assignee: JLG Industries, Inc., McConnellsburg, Pa.

[21] Appl. No.: 887,358

[22] Filed: Mar. 16, 1978

[51] Int. Cl.² ............................................. F24J 3/02
[52] U.S. Cl. ..................................... 126/439; 126/443
[58] Field of Search ............... 126/270, 271, 424, 438, 126/439, 443, 448; 237/1 A; 60/641

[56] References Cited

U.S. PATENT DOCUMENTS

| 588,177 | 8/1897 | Reagan, Jr. | 60/641 X |
| 4,002,160 | 1/1977 | Mather, Jr. | 126/271 |
| 4,026,273 | 5/1977 | Parker | 126/271 |
| 4,055,161 | 10/1977 | Jones | 126/271 |
| 4,120,285 | 10/1978 | Nugent | 126/271 |
| 4,134,392 | 1/1979 | Livermore et al. | 126/271 |

Primary Examiner—Carroll B. Dority, Jr.
Assistant Examiner—Lee E. Barrett
Attorney, Agent, or Firm—Brady, O'Boyle & Gates

[57] ABSTRACT

For use with or without multi-axis orientation means, a solar energy collector and transfer apparatus features tandemly arranged solar energy concentrators intervened by energy absorber and transfer units in a generally planar unitized array with back reflectors to energize the side of the apparatus away from the sun. In a practical embodiment, the tandem energy concentrators are parabolically curved reflectors fore and aft of energy absorbing and transfer tubes which are disposed at the exit apertures of the reflectors or field focuses. A simplified fluid transport system is embodied in the apparatus together with efficient and economical supporting structure for the energy concentrators and associated absorber and transfer units.

15 Claims, 12 Drawing Figures

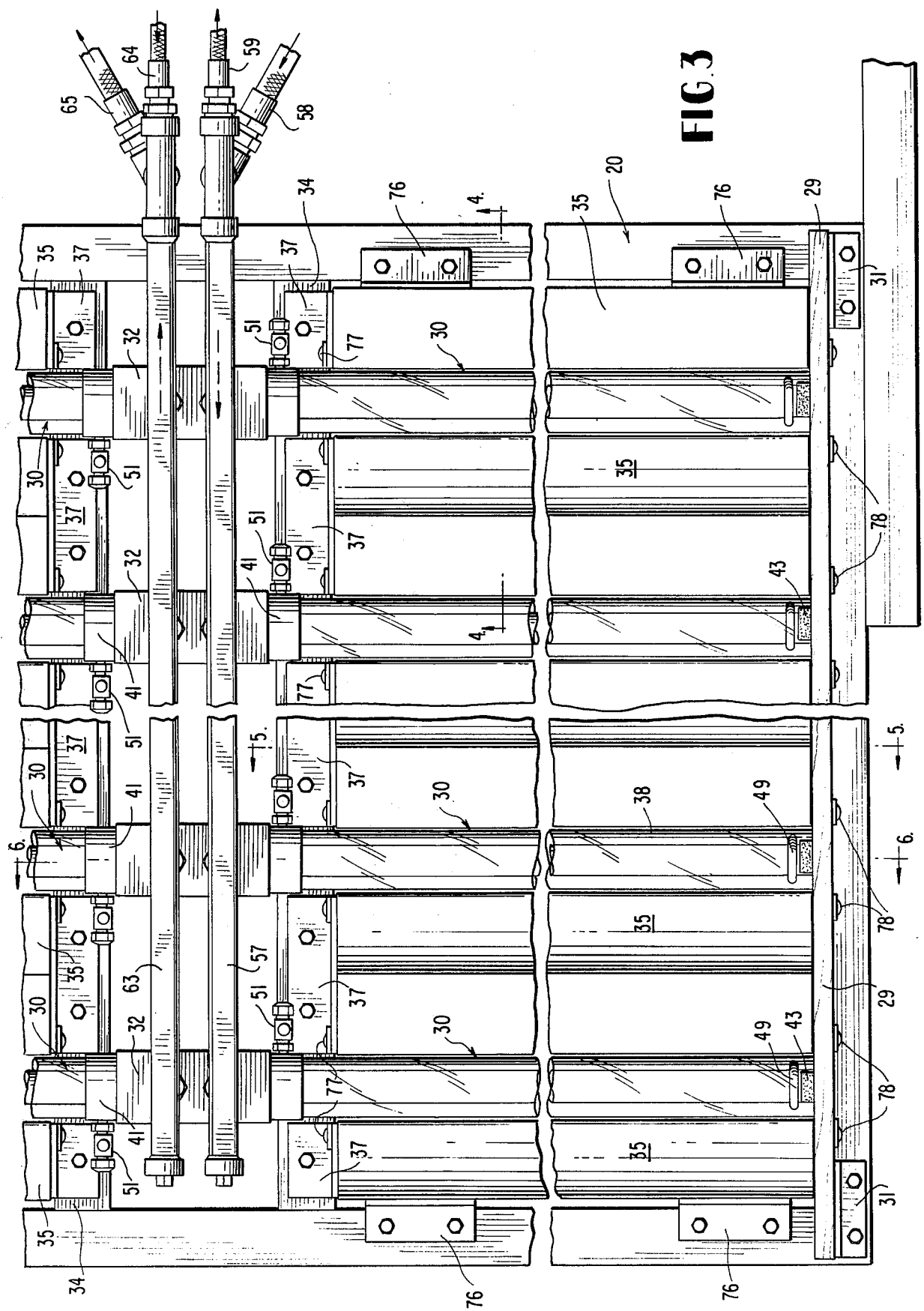

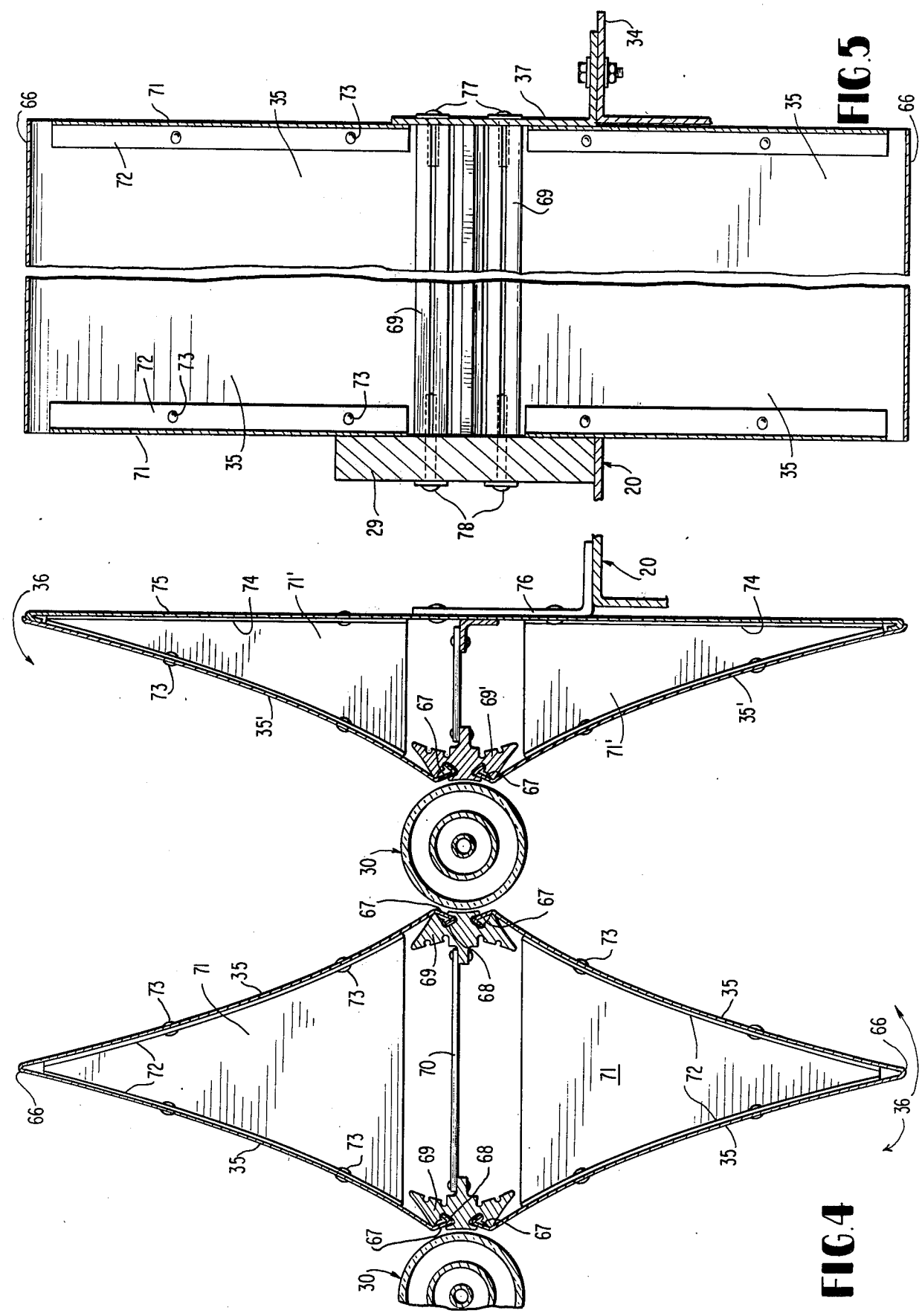

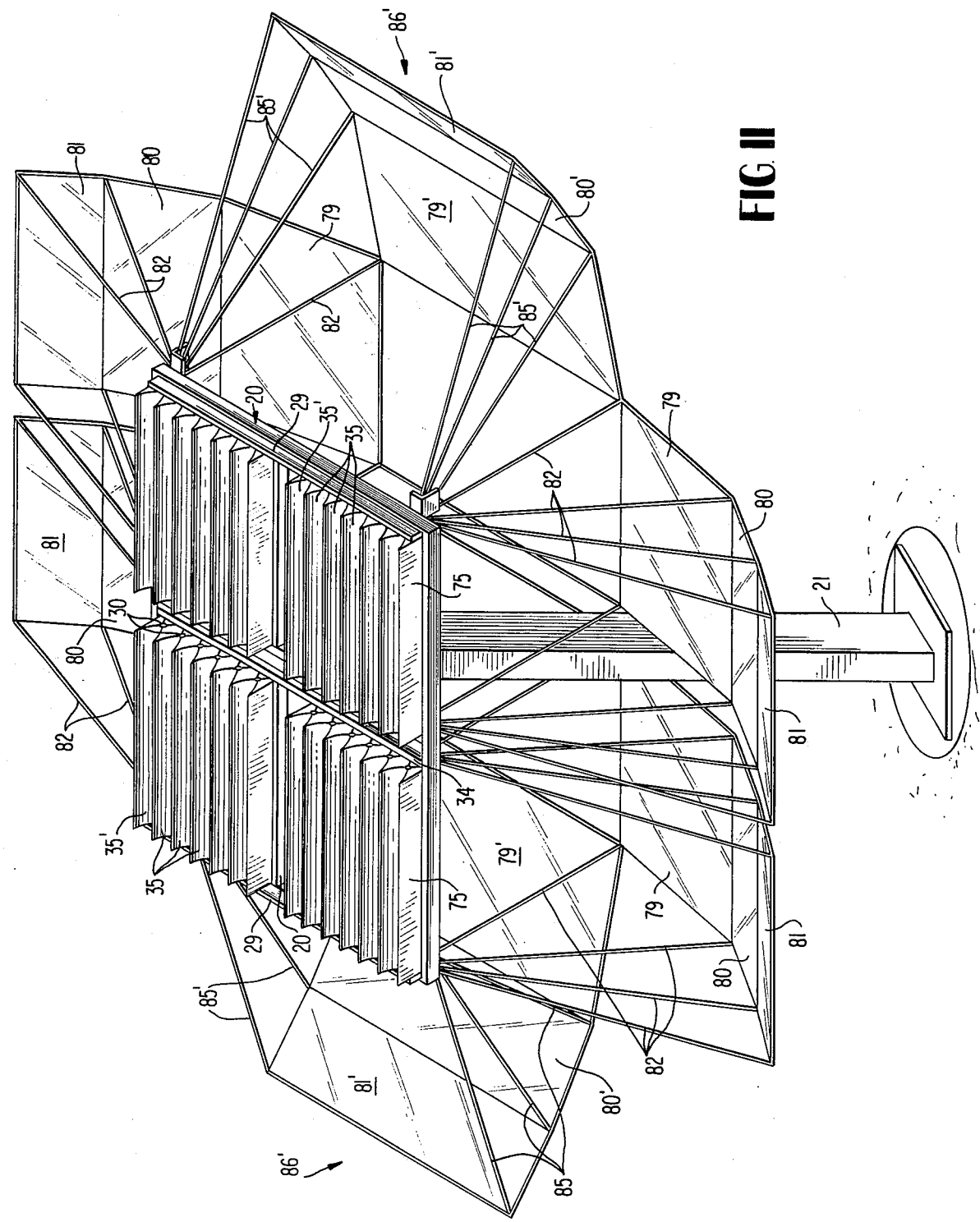

SOLAR ENERGY COLLECTOR AND TRANSFER APPARATUS

BACKGROUND OF THE INVENTION

Constantly increasing efforts to utilize solar energy in efficient and practical ways has created a demand for better energy collectors and associated absorber and transfer means. The general objective of the invention is to satisfy this need to the greatest extent possible by provision of a solar energy collector and transfer apparatus of increased efficiency and practical and comparatively economical construction. More particularly, the invention is embodied in a unitized collector and transfer apparatus which can be supported by a multi-axis orientation device or can, in some cases, form part of a static structure, such as a roof. The apparatus essentially consists of a panel array of concentrators intervened by energy absorber and transfer units with the concentrators arranged in tandem pairs so as to extend on opposite sides of a plane in which said absorber and transfer units are located. A back reflector means is positioned in spaced relation to the panel array on the side thereof facing away from the sun.

The prior art contains numerous proposals for solar collectors and collector-transfer devices and some examples of the patented prior art are contained in the following U.S. Pat. Nos.:

1,074,219 1,814,897 2,759,106 2,872,915 2,969,788
3,817,605 3,868,823 3,903,699 3,905,352 3,923,381
3,957,030 3,960,136 3,964,464 4,007,729.

Various features and advantages of the invention over the prior art, in addition to those already enumerated, will be apparent during the course of the following description.

SUMMARY OF THE INVENTION

A main frame suitable for mounting on a turntable or other orientation mechanism or for forming part of a static structure forms the supporting means for a planar array of solar energy concentrators arranged in tandem pairs in alternating relationship with coextensive energy absorber and transfer units which are positioned at the field focuses of each side-by-side pair of concentrators. The concentrators are preferably in the form of parabolically curved reflectors and the absorber and transfer units are preferably evacuated tube units having fluid connections through manifold blocks with fluid supply and delivery headers arranged adjacent to the planar array.

The apparatus includes an efficient and economical support system for the tandem energy concentrating reflectors which are maintained spaced slightly from the absorber-transfer tubes and in symmetry therewith. The invention includes evacuation means for the dry chambers of the absorber-transfer tubes, or, alternatively, pre-evacuated and sealed tube units may be employed. The back reflector means is suspended on the main frame of the apparatus in fixed relationship to the planar array for the most efficient possible optical coaction therewith. The apparatus is susceptible to variations in its configuration within the scope of the invention.

BRIEF DESCRIPTION OF THE DRAWINGS

FIG. 3 is an enlarged fragmentary plan view of the apparatus, with parts omitted for clarity.

FIG. 4 is a vertical section on an enlarged scale taken on line 4—4 of FIG. 3.

FIG. 5 is an enlarged fragmentary vertical section taken on line 5—5 of FIG. 3.

FIG. 11 is a schematic perspective view, similar to FIG. 1, with parts omitted for clarity and showing a further modification of the apparatus which is a combination of the basic forms shown in FIGS. 1 and 9 with the tandem parabolic reflector panels and absorber tube units oriented with their axes parallel with the earth.

DETAILED DESCRIPTION

Figure 1:
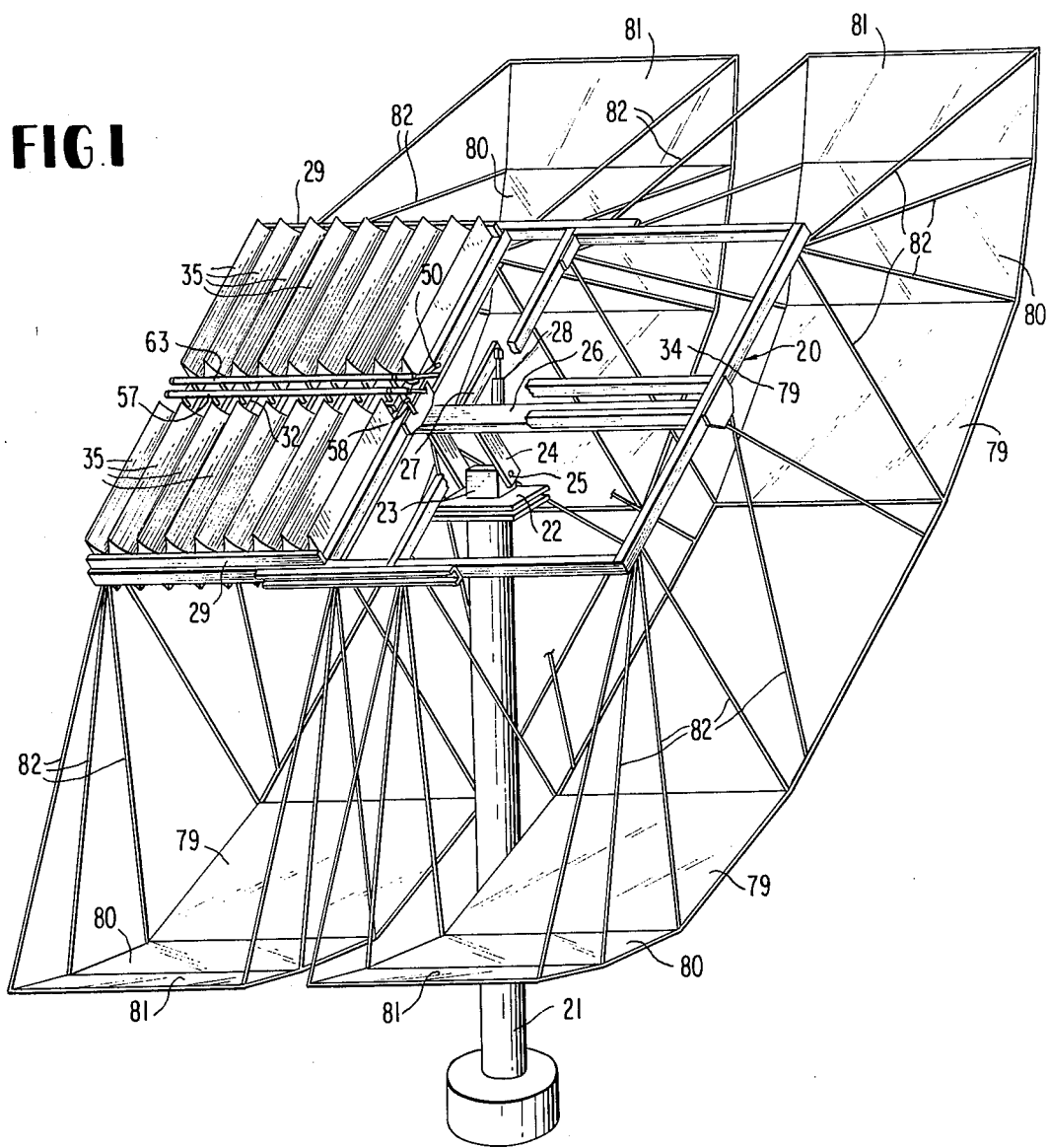
FIG. 1 is a perspective view of an integrated solar energy collector and absorber-transfer apparatus embodying the invention.

Referring to the drawings in detail, wherein like numerals designate like parts, the numeral 20 designates a main support frame for the apparatus which is rectangular and upon which the principal components making up the invention are mounted, as will be fully described. As previously mentioned, the apparatus can be mounted on a static structure such as being built into the roof of a building or may be supported on some form of orientation device. This latter arrangement is depicted in FIG. 1. In this figure, a support pedestal 21 for the apparatus carries a turntable at its top including a rotational turntable platform 22 which turns on the vertical axis of the pedestal. The platform 22 carries a mounting block 23 fixed thereon and support arms 24 pivoted to the block 23 as at 25 in turn carry a cross member 26 to which the frame 20 is suitably attached. A crank arm 27 rigid with the cross member 26 is connected with a power actuator 28 which can be energized to swing the frame 20 and all parts supported thereon around the axis of the pivot 25 which is normal to the rotational axis of the turntable platform 22. In this manner, the solar energy apparatus can be positioned in the most advantageous way relative to the sun and the position can be changed constantly to follow the sun. Other forms of orientation means can also be employed, if desired, such as any conventional heliostat means.

Whether mounted on an orientation means, as shown in FIG. 1, or on a static structure, the apparatus additionally comprises mounting rails 29 of wood or other material suitably secured to and extending along two parallel sides of the frame 20 and also projecting there-above. These mounting rails 29, as will soon become apparent, serve to directly support the outer ends of multiple spaced parallel solar energy absorber-transfer tube units 30 arranged in four discrete banks on opposite sides of the member 26, FIG. 1, and in a common plane near and slightly above the rectangular frame 20. As best shown in FIG. 3, the rails 29 can be anchored to the main frame 20 by angle brackets 31 or by any other suitable means.

Figure 6:
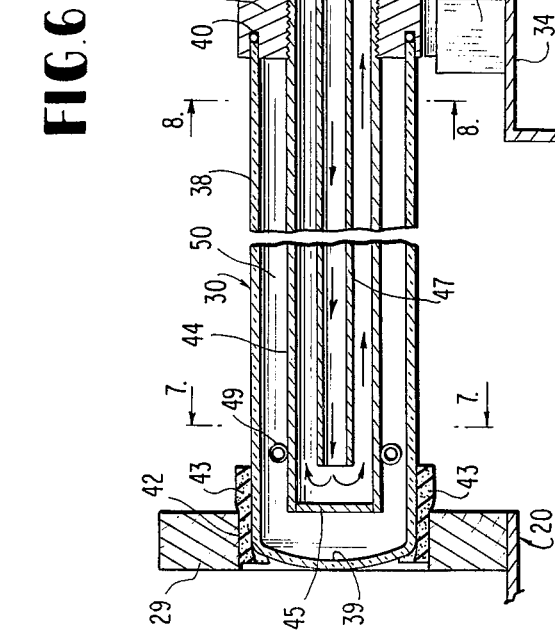
FIG. 6 is a similar section taken on line 6—6 of FIG. 3.

The interior ends of the tube units 30 are supported by manifold blocks 32 at the center of the frame 20 and between the two banks of tube units, FIGS. 3 and 6. These manifold blocks rest on spacer elements 33 which in turn are supported by a pair of main frame bars 34 near the center of the frame 20, FIG. 1.

Arranged in parallel alternating or intervening relationship with the banks of tube units 30 are solar energy directing, concentrating or focusing devices preferably in the form of tandemly mounted parabolically curved elongated reflector panels 35 of polished sheet metal. These concentrating reflector panels 35 are substantially coextensive lengthwise with the tube units 30 in the four discrete banks. As best shown in FIGS. 4 and 5, the panels 35 are symmetrically arranged relative to the tube units 30 with the latter located at the exit apertures or field focuses of each side-by-side diverging pair of the parabolic reflecting panels 35. The panels 35 extend equidistantly on opposite sides of the common plane in which the tube units 30 are located to thereby define between the outer longitudinal edges of the panels 35 receiving apertures 36 for solar radiation, which receiving apertures are also symmetrical with and spaced equidistantly from the exit apertures in which the tube units 30 are located. It should be noted in FIG. 4 that the cylindrical tube units 30 having their peripheries slightly spaced from the panels 35 and do not physically contact the reflector panels at any points.

As will presently become apparent, the rails 29 also form support means for the outer ends of the panels 35 in the four banks or arrays of panels, FIG. 1, while their inner ends are connected through L-brackets 37 to the frame members 34. Continuing with the description of the support means for the tube units 30, each of the identical tube units comprises an outer cylindrical glass jacket 38, FIG. 6, which readily transmits solar energy therethrough, this jacket having a closed outer end wall 39 and having an open end 40 socketed in an annular groove of a sealing collar 41 abutting one end face of the adjacent manifold block 32. Thus, the inner end of glass jacket 38 is supported in the collar 41. The outer closed end of each glass jacket 38 is held within an opening 42 of the adjacent rail 29 and cushioned therein by a pair of resilient pads 43.

Each tube unit 30 further comprises an intermediate metallic solar energy absorber tube 44 whose outer surface is rendered dull black for maximum absorbency. The absorber tube 44 has a closed outer end wall 45 and an open screw-threaded inner end portion 46 projecting through the collar 41 and having engagement with a threaded opening in the manifold block 32. An interior open ended transfer fluid delivery tube 47 is located concentrically in the absorber tube 44 in spaced relation thereto and has an inner screw-threaded end portion 48 engaged in a screw-threaded opening of the manifold block 32. An annular coil spring spacer 49 snugly surrounding the absorber tube 40 near its cantilevered end away from the block 32 prohibits any appreciable lateral movement of the tube 44 at its free end through contact with the supported jacket 38.

Figure 8:
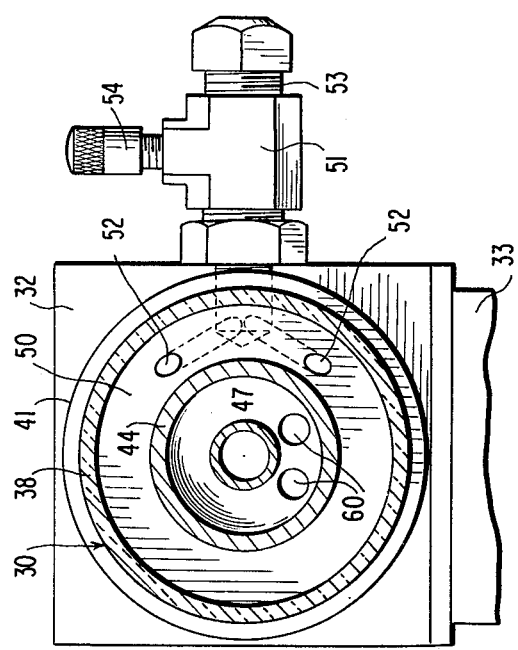
FIG. 8 is a similar section taken on line 8—8 of FIG. 6.
Figure 7:
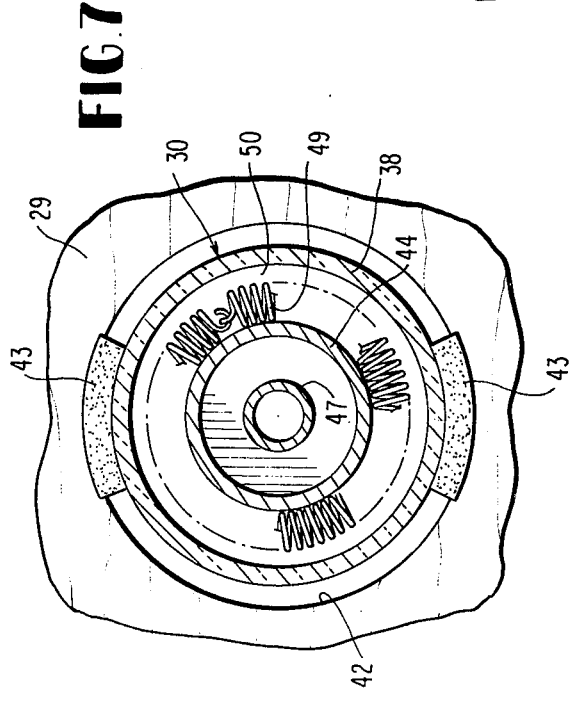
FIG. 7 is an enlarged transverse vertical section taken on line 7—7 of FIG. 6.

In some cases, presealed and pre-evacuated energy absorber-transfer tube units can be utilized in the invention. However, in the illustrated embodiment, the annular chambers 50 between the glass jackets 38 and metal absorber tubes 44 are each evacuated in the following manner. An adjustable evacuation cock 51 connected through each collar 41 communicates with evacuation ports 52 leading into the inner end of each chamber 50, see FIG. 8. Each cock 51 can be connected at proper times through a nipple 53 with a suitable source of vacuum and is equipped with a closing device 54. The evacuation cock 51 is not required when the absorber-transfer units are pre-evacuated, as noted.

Each transfer fluid delivery tube 47 in one bank or quadrant of the collector apparatus, FIG. 1, receives fluid through a right angular delivery port 55 in the adjacent manifold block 32 between adjacent quadrants. Each delivery port 55 of the apparatus is connected through a hose 56 with an overhead transfer fluid supply header 57 which is spaced somewhat above the level of the reflective panels 35 at the top of the apparatus and extends perpendicular to the axes of the tube units 30 and panels 35, FIG. 3. The fluid supply or delivery header 57 at one end receives a suitable fluid through a connection 58 and after the energy transfer takes place in the tube units 30 of the associated bank, the fluid is delivered to a utilization point through another connection 59. It should be clearly understood that the delivery header 57 is common to all of the manifold blocks 32 and common to all of the tube units 30 in one bank which are connected to corresponding ends of the manifold blocks in the manner shown and described in FIG. 6, the blocks 32 being centered between the two banks of tube units as clearly shown in FIG. 3.

The second bank of tube units at the opposite ends of the blocks 32, FIG. 6, are constructed and supported in the identical manner above-described and have exactly the same functional components identified by the reference numerals. This second bank of tube units receives its transfer fluid serially from the axially aligned tube units 30 of the opposite bank through connecting passages 60 of the manifold blocks 32, as shown by the arrows in FIG. 6. The fluid thus received circulates outwardly in the absorber tubes 44 of the second bank and then inwardly through the adjacent tubes 47 to finally exit through right angular exit or return ports 61 in the blocks 32. The exit ports 61 are connected individually through hoses 62 to a second manifold 63 spaced from and parallel to the manifold 57. The second manifold 63 for the second tube bank has a fluid delivery connection 64 and a return or outlet connection 65 leading to a utilization point after the energy transfer has taken place in the associated bank of tube units 30.

The previously-mentioned parabolically curved reflecting panels 35 are preferably formed and supported in the following manner. Each back-to-back pair of the panels 35 on opposite sides of the plane containing the banks of tube units 30 and between each pair of tube units 30, FIG. 4, is formed from a single section of sheet metal bent upon itself to produce an apex 66 at the receiving aperture 36. The inner longitudinal edge portions of the unitary sheet metal section used to produce each adjacent pair of panels 35 are further bent to form claw-like terminals 67 which slidably engage lengthwise in longitudinally extending locking passages 68 of extruded frame bars 69 which are tied in back-to-back spaced relationship at appropriate points by tie braces 70. The extruded frame bars 69 are coextensive lengthwise with the reflector panels 35 and the latter are substantially coextensive with the tube units 30 of the two banks, as previously noted. As depicted in FIG. 4, each dual pair of panels 35 above and below the plane in which the tube units 30 lie are unitized with one pair of the extruded frame bars 69 which support the panels 35 rigidly in the apparatus.

At their opposite ends, the back-to-back pairs of panels 35 are connected by end gusset plates 71 for further rigidity and the flanges 72 of these end gusset plates are riveted at 73 to the panels 35. As further illustrated in FIG. 4, at the opposite sides of each bank of tube units and reflectors encompassed by the main frame 20, there are half-reflector assemblies consisting of a single extruded frame bar 69', a single pair of tandem reflector panels 35' and a pair of roughly triangular half-gusset plates 71' at opposite ends of the panel assembly. The outer straight side flanges 74 of half-gusset plates 71' are riveted to a single flat plate 75 which spans the entire outer side of each side assembly embodying the reflector panels 35'. Each such side assembly is supported on an adjacent bar of the main frame 20 by L-brackets 76.

Corresponding ends of all of the reflector panel assemblies in each bank of the apparatus on the frame 20 are supported by the aforementioned L-brackets 37 which receive screws 77 through their vertical webs. These screws 77, FIG. 5, are received in threaded openings formed in the adjacent ends of the extruded reflector frame bars 69 and 69'. The other corresponding ends of the frame bars 69 and 69', FIG. 5, receive screws 78 which extend through openings in the adjacent rails 29, and thus both ends of the reflector panel assemblies are solidly supported on the main frame 20 independently of the tube units 30 whose supporting means has been previously described.

Figures 2, 2A:
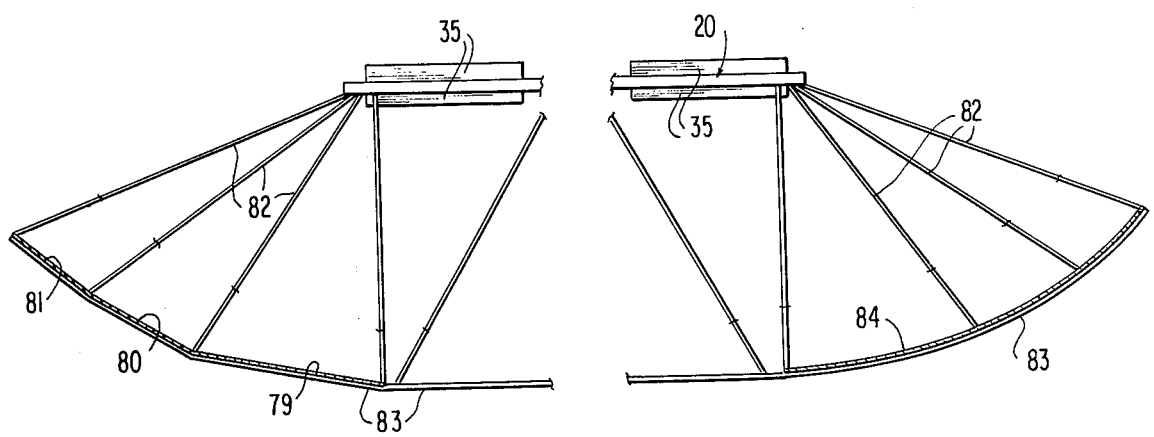
FIG. 2 is a fragmentary partly schematic side elevation of the apparatus depicting the optical relationship of the back reflector means to the reflective concentrator means of the collector structure.
FIG. 2A is a view similar to FIG. 2 showing a variant of the back reflector means.

The apparatus in the embodiment of FIG. 1 includes back reflector means as shown in FIGS. 1 and 2, the purpose of which is to equalize to the extent possible the concentration of solar radiation on both sides of the tube units 30 in the four banks of such units supported by the main frame 20. The side of the apparatus facing the sun, namely the uppermost side in FIG. 1, receives the sun's rays directly and such rays impinge directly on the upper parabolic reflector panels 35 and 35' and are concentrated by these upper panels on the tops of the tube units 30 in the four banks.

The "cold" side of the collector apparatus away from the sun must receive solar radiation indirectly from the aforementioned back reflector means. Referring to FIGS. 1 and 2, this means comprises angled flat back reflector panels 79, 80 and 81 for each of the four quadrants or banks of the apparatus. These back reflector panels are all suspended in connected relationship from the main frame 20 by suspension rods 82 whose top ends are suitably anchored to the main frame 20 and whose lower ends are connected with additional support rods 83 which extend beneath the reflector panels 79, 80 and 81 to cradle them in the required positions. The angularity of the panels 79, 80 and 81 is carefully chosen to reflect the solar radiant energy onto the parabolic panels 35 and tube units 30 at the far side of the apparatus in the most efficient manner possible whereby the tube units 30 receive the solar radiant energy over their entire lengths in each bank or quadrant of the apparatus. The parabolic reflector panels 35 and 35' at both sides of the apparatus function in the same manner to concentrate or focus solar energy onto the tube units 30 which, as stated, are disposed at the exit apertures or field focuses of the coacting pairs of panels 35 on each side of the apparatus.

The solar radiant energy, after passing through the glass jackets 38 and across the evacuated chambers 50, is absorbed by the blackened tubes 44 and the energy is transferred to the fluid passing through the spaces between the tubes 47 and 44 for ultimate delivery to a utilization point via the header 63.

As shown in FIG. 2A, in lieu of the flat angular back reflector panels 79, 80 and 81, a single curved back reflector panel 84 may be employed for each quadrant of the apparatus to reflect the solar energy on the backs or far sides of the tube units 30 and their associated far side parabolic reflector panels 35 and 35'.

Figure 9:
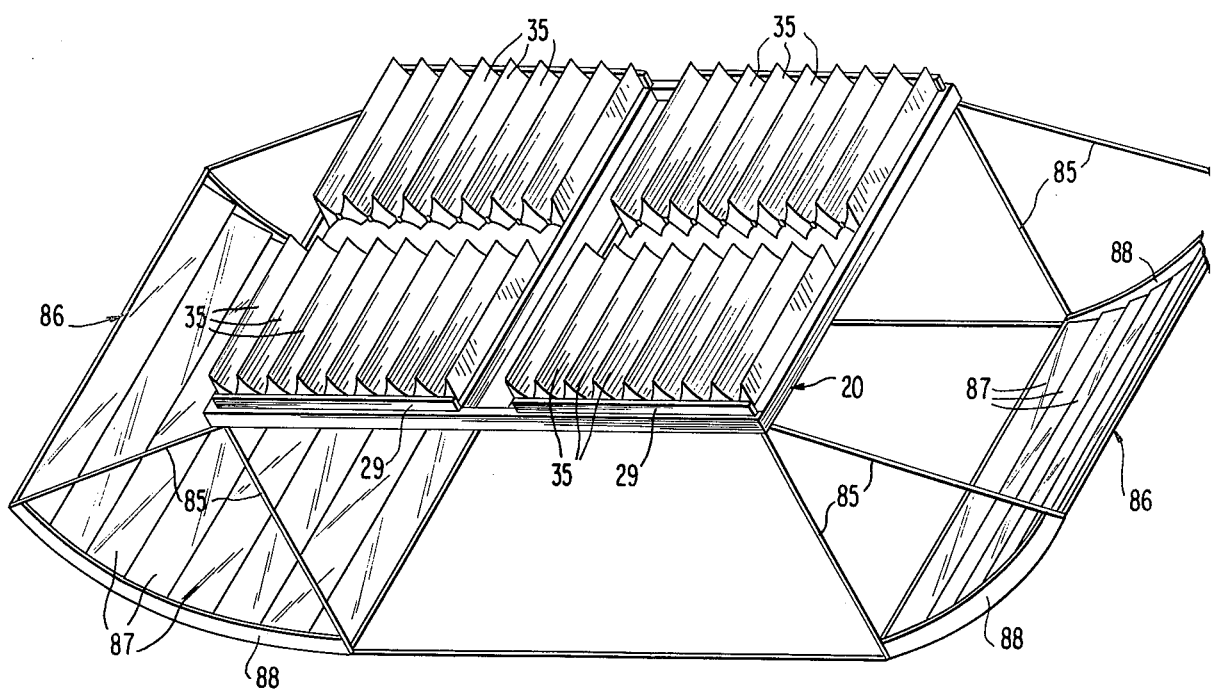
FIG. 9 is a perspective view on a partly schematic basis showing a modification of the apparatus.
Figure 10:
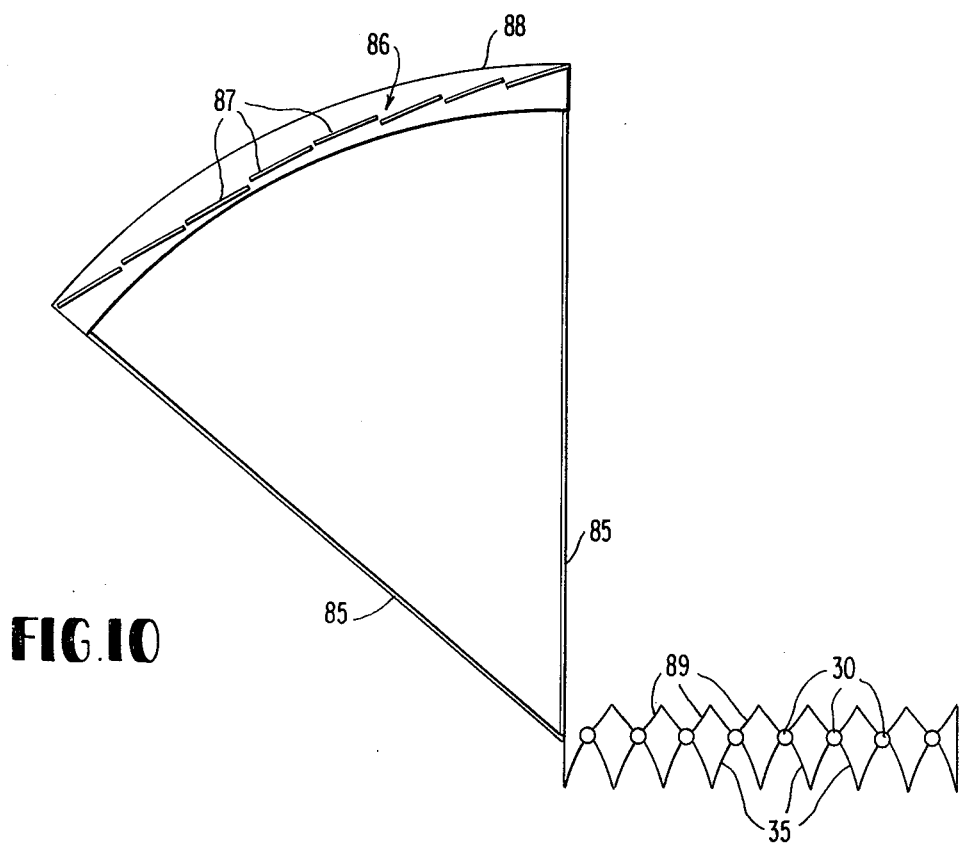
FIG. 10 is a partly schematic side elevational view showing the relationship of back reflector means to one section of the collector structure in FIG. 9 and being inverted in relation to FIG. 9.

FIGS. 9 and 10 depict a modified form of the invention in which the main frame 20 supports four banks or quadrants of the tube units 30 and associated parabolic reflector panels 35 in the same manner depicted in FIG. 1 for the side of the apparatus which faces the sun. However, in lieu of the back reflector means shown in FIGS. 1, 2 and 2A, the invention in FIGS. 9 and 10 employs a different form of back reflector means as follows. At each end of the main frame 20 suspended therefrom by rods 85, similar to the rods 82, a pair of back reflectors 86 are utilized each consisting of a series of parallel elongated reflector slats 87 held at their ends in arcuate frame members 88 secured to the suspension rods 85. The slats 87 may be flat individually or slightly curved. One reflector slat 87 is provided on each back reflector 86 for each wide angle parabolic reflector 89 of the collector structure. Each reflector 86 services two banks or quadrants of the collector apparatus, as shown. On the far side of the apparatus away from the sun, FIG. 10, the wider angle reflectors 89 are employed in lieu of the previously-described reflectors 35 of the preceding embodiment. The reflectors 35 are utilized only on the upper side of the apparatus in FIG. 9 which faces the sun. In some cases, the wide angle reflector means 89 may be eliminated entirely leaving only the parabolic reflectors 35 on the side of the apparatus facing the sun. In this case, the reflector slats 85 will serve to back reflect solar energy directly on the tube units 30. When employed, the wide angle reflectors 89 help in concentrating the solar energy on the tube units 30 generally in the same manner that the reflectors 35 function in the invention.

It will be noted that a single pair of reflector assemblies 86 having their slats 87 parallel to the tandem parabolic reflectors 35 and 89 service the four quadrants of the collector structure in FIG. 9. In the arrangement of FIG. 1, a separate back reflector consisting of the elements 79, 80 and 81 is provided for each quadrant of the collector structure, and the axes of these back reflector components are across the tandem parabolic reflectors 35 instead of parallel thereto. In general, the mode of operation of the invention is the same in each disclosed form and the other parts of the apparatus omitted in FIGS. 9 and 10 remain identical to the corresponding parts described in connection with FIGS. 1 through 8. If desired, the back reflector elements 79, 80 and 81, or 84, can be arranged on the opposite side of the frame 20 in the same manner as the reflector assemblies 86 in FIG. 9, so that the axes of these back reflector components are parallel with the tandem parabolic reflectors 35.

FIG. 11 schematically shows a further modified form of the invention which is a combination of the basic forms of the invention shown in FIGS. 1 and 9. Similar to the arrangement of FIG. 1, a separate back reflector consisting of the back reflector elements 79, 80 and 81 connected to the top and bottom of the main frame 20 by suspension rods 82, is provided for each quadrant or section of the collector structure. However, the tandem parabolic reflector panels 35 and 35' and tube units 30, instead of being oriented with their longitudinal axes in planes perpendicular with the surface of the earth, and at right angles to the longitudinal axes of the back reflecter elements 79, 80 and 89, are oriented with their longitudinal axes parallel with the surface of the earth and with the longitudinal axes of the mentioned back reflecter elements, as shown. With the parabolic reflector panels 35,35' and tube units 30 arranged horizontal relative to the horizon, reduced sun tracking accuracy is required for the main frame on an orientation means for tracking daily sun movement, and this orientation also increases the tracking accuracy for seasonal sun movement, because the receiving apertures 36 facing the sun are effectively larger relative to the sun position for an extended period of time and receive the sun's rays in any set position for a longer period of time before having to be reorientated to maintain track of the sun. This is because the collectors have a greater acceptance angle facing the sun and the receiving apertures 36 are in the plane in which the sun travels across the horizon on a daily basis. Thus, this horizonal arrangement is preferred when the apparatus is mounted on a static structure with no orientation means.

In addition, the form of the invention shown in FIG. 11 includes a pair of end back reflectors 86' at each end of the main frame 20 suspended therefrom by rods 85' similar to the rods 82. As in the form of the invention shown in FIG. 9, each end back reflector 86' services two quandrants or sections of the collector apparatus since there is no pedistal 21 or other obstruction that requires division of the end reflectors as is required for the top and bottom reflector units. Each end reflector 86' is constructed basically the same as the top and bottom reflector units and may consist of similarly arranged back reflector elements 79', 80' and 81'. With back reflector units on all four sides of the frame 20, each quandrant or section of the collector apparatus receives back reflected radiation from the sun from two sides, either the top and one end or the bottom and one end, thus greatly increasing the concentration of radiation received by the back parabolic reflector panels 35, 35' of the tandem pair and the heat concentrated on and received by the solar energy absorber-tandem tube units 30 which increases the heat transfer efficiency of the apparatus.

It is to be understood that in this form of the invention, any compatable combination of modified forms previously disclosed can be utilized for a particular situation or application. In view of the back reflector elements 79, 80 and 81 shown for the top and bottom reflector units, the back reflector construction of FIG. 2A can be used or the individual flat or slightly curved reflector slats 87 of FIGS. 9 and 10 may be utilized. The construction of FIG. 2A could also be used for the end back reflector units 86'. In addition, wide angle parabolic reflectors 89 as disclosed in FIGS. 9 and 10 can be used for the back parabolic reflectors instead of parabolic reflector panels 35 and 35' making up the rear parabolic reflectors of the tandem pair of the same configuration and size as the front parabolic reflectors.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A solar energy collector and transfer apparatus comprising a main support frame, a plurality of spaced parallel solar energy absorber-transfer tube units mounted on said main support frame and arranged in a common plane, solar energy intercepting and concentrating panels mounted on said main support frame and arranged in tandem relationship on opposite sides of said tube units, said panels comprising coacting pairs of parabolically curved reflector panels on opposite sides of said tube units and projecting on opposite sides of said plane in which said tube units are located and longitudinally of the tube units in parallel relationship thereto, each side-by-side pair of reflector panels defining a receiving aperture and an exit aperture, a tube unit disposed in each exit aperture between tandemly arranged pairs of said panels; and back reflector means supported from said main support frame and spaced from said tube units, whereby solar rays impinging directly on the parabolic reflectors on one side of the tube units are concentrated on the sun side of the tube units, and the parabolic reflectors on the opposite side of the tube units receive sun rays reflected from the back reflector means to thereby concentrate the reflected rays on said opposite side of the tube units, whereby the concentration of solar radiation is substantially equalized on both sides of the tube units to thereby heat fluid flowing through said tube units.

2. A solar energy collector and transfer apparatus as defined in claim 1, and multi-axis orientation means connected with said main frame.

3. A solar energy collector and transfer apparatus as defined in claim 1, and transfer fluid delivery and return conduit means connected with said absorber-transfer tube units.

4. A solar energy collector and transfer apparatus as defined in claim 3, and said transfer fluid delivery and return conduit means comprising separated fluid delivery and return headers, and fluid delivery and return manifold blocks connected with pairs of said tube units and also connected with said headers at spaced points along the headers.

5. A solar energy collector and transfer apparatus as defined in claim 4, and said tube units disposed in banks in said common plane on opposite sides of said manifold blocks, each tube unit having an outer solar energy transmitting jacket which is evacuated, and a solar energy absorber-transfer tube means within the jacket and communicating with a passage in the adjacent manifold block leading to one of said headers.

6. A solar energy collector and transfer apparatus as defined in claim 5, and adjacent pairs of tube units in said banks being serially connected by passage means in said manifold blocks whereby transfer fluid delivered through the manifold blocks to the tube units of one bank is returned through the tube units of the other bank and through said manifold blocks.

7. A solar energy collector and transfer apparatus as defined in claim 1, and pairs of said reflector panels between tube units on opposite sides of said plane being formed from unitary bent sheet metal sections having apexes forming receiving apertures between adjacent apexes, said sheet metal sections having end terminals near said common plane, and elongated support bars for said bent sheet metal sections having longitudinal retaining passages formed therein for said end terminals of the bent sheet metal sections.

8. A solar energy collector and transfer apparatus as defined in claim 7, wherein said elongated support bars are extrusions.

9. A solar energy collector and transfer apparatus as defined in claim 1, and said back reflector means comprising plural angled reflector plates positioned on said main support frame adjacent to each of four quadrants of the apparatus in said common plane occupied by said tube units and said intercepting and concentrating means.

10. A solar energy collector and transfer apparatus as defined in claim 1, and said back reflector means comprising arcuate reflector plates on said main support arranged to reflect solar radiant energy onto four discrete quadrants in said common plane in which said tube units and said intercepting and concentrating means are situated.

11. A solar energy collector and transfer apparatus as defined in claim 1, and said back reflector means comprising two arrays of reflector slats on said main support frame, there being one slat in each array for each unit of said intercepting and concentrating means and for each tube unit in said apparatus.

12. A solar energy collector and transfer apparatus as defined in claim 11, and the longitudinal axes of said slats being parallel with the axes of the tube units.

13. A solar energy collector and transfer apparatus as set forth in claim 1 in which said back reflector means comprises arrays of reflector plates angularly arranged relative to each other, said arrays supported outwardly of said main support frame on at least two sides thereof to reflect solar radiant energy onto the solar energy intercepting and concentrating means of the tandem assembly that are positioned between said tube units and said arrays.

14. A solar energy collector and transfer apparatus as set forth in claim 13 including arrays supported outwardly on four opposite sides of said main support frame.

15. A solar energy collector and transfer apparatus as set forth in claim 14 in which said arrays on adjacent sides of said main support frame are arranged to each reflect solar radiant energy onto at least one discrete quadrant of said common plane in which said tube units and said intercepting and concentrating means are situated.

* * * * *